(12) United States Patent
Okamura

(10) Patent No.: US 7,791,774 B2
(45) Date of Patent: Sep. 7, 2010

(54) SCANNING OPTICAL APPARATUS

(75) Inventor: Hideki Okamura, Osaka (JP)

(73) Assignee: Kyocera Mita Corporation, Osaka (JP)

( * ) Notice: Subject to any disclaimer, the term of this patent is extended or adjusted under 35 U.S.C. 154(b) by 966 days.

(21) Appl. No.: 11/590,190

(22) Filed: Oct. 31, 2006

(65) Prior Publication Data
US 2007/0121187 A1    May 31, 2007

(30) Foreign Application Priority Data
Nov. 30, 2005 (JP) ............... 2005-346691

(51) Int. Cl.
H04N 1/04 (2006.01)
(52) U.S. Cl. .................. 358/481; 358/474; 358/475
(58) Field of Classification Search .......... 358/481, 358/474, 475
See application file for complete search history.

(56) References Cited
U.S. PATENT DOCUMENTS 6,633,423 B2 * 10/2003 Ishibe ............... 359/207.1
6,717,705 B2   4/2004 Takakubo
7,072,088 B2 * 7/2006 Ishihara ............. 359/207.1
2007/0058231 A1 * 3/2007 Kim et al. .......... 359/205

FOREIGN PATENT DOCUMENTS
JP    2003-149573    5/2003

* cited by examiner

Primary Examiner—Houshang Safaipour
(74) Attorney, Agent, or Firm—Jordan and Hamburg LLP

(57) ABSTRACT

To provide a scanning optical apparatus, not requiring a lens in a complex figure, and also, capable of eliminating the bow of a beam light even when a plurality of correcting lenses are in an identical figure.

Beam light L falls on Cross section K perpendicular to Rotational axis 1a of Polygon mirror 1 at an angle of 2° or less. When such an incident angle condition is satisfied, the figure of a cross section in the sub scanning direction of Scanning lens 9 is a spherical surface figure, and also, the curvature of Incident surface 9a and Outputting surface 9b with respect to the sub scanning direction is changed according to the position in the main scanning direction. Furthermore, Correcting lens 10 is arranged in a tilted (decentered) state with respect to the light axis of Beam light L.

6 Claims, 7 Drawing Sheets (a)

(b)

(a)

(b)

SCANNING OPTICAL APPARATUS

BACKGROUND OF THE INVENTION

1. Field of the Invention

The present invention relates to a scanning optical apparatus for scanning a light outputted from a light source on a prescribed surface.

2. Description of the Related Art

In image forming apparatuses such as printers, copiers, and facsimiles, for the purpose of writing an electrostatic latent image on an image supporter (hereinafter referred to as "photoreceptor drum"), a scanning optical apparatus which scans a beam light for writing an electrostatic latent image on said photoreceptor drum is employed.

Such scanning optical apparatus uses a polarizer such as a polygon mirror for transforming the beam light into a scanning light. The beam light from a light source is converged on the surface of the polarizer, then converged again on the photoreceptor drum by a lens (so called, f. theta. lens). That is, the beam light is coupled in relation to the surface of the polarizer and the photoreceptor drum, thereby correcting an optical face tangle error of the polarizer.

In recent years, so-called a tandem-type image forming apparatus is employed as an image forming apparatus having a full-color printing function, which forms toner (developer) images of each kind (color) on each of a plurality of photoreceptor drums, and then, superimposes these images on an intermediate transfer unit, thereby forming a full-color image.

In such a tandem-type image forming apparatus and the like, a plurality of light sources corresponding to each of a plurality of photoreceptor drums are used for writing the electrostatic latent image simultaneously on the plurality of photoreceptor drums. The beam light emitted from each of the plurality of light sources are collectively reflected by the photoreceptor drums, and transformed into a scanning light. Here, separation of each of the beam lights after being reflected by the polygon mirror is required in order to guide each of the beam lights to the corresponding photoreceptor drums.

As shown in FIG. 3, separation of each of beam lights L is typically conducted by providing angular differences with the incident angles at which Beam lights L fall on with respect to a cross section K perpendicular to the direction of a rotational axis 1a of a polygon mirror 1 (sub scanning direction). Accordingly, when separation of Beam lights L is required, Beam lights L often fall on the mirror surface of Polygon mirror 1 (more precisely, Rotational axis 1a of Polygon mirror 1), in an inclined state, not being perpendicular, with respect to the mirror surface.

In addition, the scanning direction of Beam light L by Polygon mirror 1 (the depth direction in FIG. 3) is hereinafter referred to as "main scanning direction". Also, the direction perpendicular to the main scanning direction is referred to as "sub scanning direction". The sub scanning direction is a direction along Rotational axis 1a of Polygon mirror 1, that is, up-and-down direction in FIG. 3.

However, when Beam light L falls on Polygon mirror 1 in an inclined state, the following problem occurs.

FIG. 5 is a schematic diagram for explaining a problem which occurs when Beam light L falls on Polygon mirror 1 in an inclined state. Hereinafter, as referring to FIG. 5, a problem of when Beam light L falls on Polygon mirror 1 in an inclined state is described in details.

As shown in FIG. 5(a), the reflecting surface of Polygon mirror 1 moves in and out in the radial direction of Polygon mirror 1 along with its rotation about Rotational axis 1a. Accompanying with such an in-and-out movement of the reflecting surface, the incident position of Beam light L also moves in and out in the radial direction of Polygon mirror 1, and, for example, the in-and-out movement for the amount of $\Delta X$ is generated.

On the other hand, as shown in FIG. 5(b), when Beam light L falls on the reflecting surface of Polygon mirror 1 in an inclined state, the position in the direction of Rotational axis 1a (sub scanning direction) at which Beam light L is reflected by Polygon mirror 1 changes according to the in-and-out movement of the incident position of Beam light L, and, for example, a change for the amount of $\Delta X$ is generated as shown in FIG. 5(b).

Here, the incident position change of Beam light L in the direction of Rotational axis 1a with respect to Polygon mirror 1 entirely equals to the incident position change of Beam light L in the sub scanning direction with respect to the photoreceptor drum, and as illustrated in full line in FIG. 5(c), the scanning path of Beam light L on a photoreceptor drum 2 is curved. Surely, it is ideal when the scanning path of Beam light L is linear along the main scanning direction as illustrated in a dashed line in FIG. 5(c). Such a curvature of the scanning path is called "bow".

In order to maintain the image quality, the bow needs to be eliminated by, for example, an optical system (such as lenses) arranged in between Polygon mirror 1 and Photoreceptor drum 2, for causing distortion of an image to be formed.

Here, in a patent literature 1 (Japanese Unexamined Patent Publication Number 2003-149573), a method for eliminating the above-mentioned "bow" is disclosed. That is, the method disclosed in Patent literature 1 is to arrange in between a polygon mirror and a photoreceptor drum, a scanning lens with its cross section shape in the scanning direction of a beam light or in the sub scanning direction perpendicular thereto formed in an anamorphic aspherical shape defined independently as a function of distance in the main scanning direction from a light axis of the beam light, as well as a correcting lens formed with the tilt of its cross section in the sub scanning direction formed to be changeable according to the position in the main scanning direction.

However, manufacturing a complex lens such as an anamorphic aspherical shape lens requires a complex die machining, and is generally very difficult. Additionally, in a multi-beam image forming apparatus using a plurality of Beam lights L as shown in FIG. 3, the correcting lens is generally distributed one by one for each of Beam lights L. Accordingly, when the bow is eliminated by means of the shape of the correcting lens as described in Patent literature 1, it is required to change the shape of each of a plurality of correcting lenses, and thus, a problem that the number of dies for manufacturing the correcting lens increases still remains.

Consequently, this invention has been invented considering the foregoing conditions, and the purpose of this invention is to provide a scanning optical apparatus, which does not require a complex shape lens and is capable of eliminating the bow of the beam light even when the shapes of a plurality of correcting lenses are uniformed.

SUMMARY OF THE INVENTION

In order to achieve the above purpose, this invention provides a scanning optical apparatus which comprises a polygon mirror for reflecting a beam light outputted from a light source as rotating about a rotational axis along a sub scanning direction of a polygon mirror and then transforming said beam light into a scanning light on a prescribed scanning surface, said scanning optical apparatus comprising a curvature changing lens which monotonically changes its curvature of a cross section in the sub scanning direction of an incident surface and/or an outputting surface of the beam light with respect to a distance from a predetermined center position in a scanning direction of the beam light, that is, a main scanning direction intersecting with the sub scanning direction, and a decentered lens arranged with its lens axis inclined (so-called "tilt") and/or displaced (so-called "shift") with respect to a light axis of the beam light after passing through the curvature changing lens.

According to the present invention, curvature of a scanning path of the beam light, that is, the "bow" can be eliminated, with a curvature changing lens in a simple (therefore, easy for die machining) shape merely changing curvature of an incident surface and/or an outputting surface of the beam light with respect to a main scanning direction, as well as a decentered lens arranged in a tilted and/or shifted state with respect to a light axis of the beam light after passing through the curvature changing lens. In other words, this allows a linear scanning path of the beam light to be maintained. For example, when the present scanning optical apparatus is applied to an image forming apparatus, the beam light can be scanned in a linear state on a photoreceptor drum, thereby forming a desirable electrostatic latent image without distortion.

Additionally, depending on the figure of the curvature changing lens, there may be a case when the shift and/or tilt of a lens in the downstream of the beam light from the curvature changing lens (hereinafter referred to as "correcting lens" in accordance with the custom) is unnecessary for eliminating the bow (that is, there is no need for using a decentered lens as a correcting lens as described in the present invention). However, when the bow is to be eliminated by merely the figure of the curvature changing lens without the shift and/or tilt of the correcting lens, spherical aberration of the beam light on the scanning surface is known to be aggravated.

In the present invention, a method for dispersing the bow-eliminating burden by means of providing both of the curvature changing lens and the decentered lens with a function for eliminating the bow is employed without eliminating the bow only by the curvature changing lens. This allows reduction of aggravation of the spherical aberration compared with when the bow-elimination is performed merely by the curvature changing lens.

Needless to say, instead of the decentered lens described in the present invention, using such as a complex-shaped aspherical lens or a surface-decentered lens having a figure surface-decentered with respect to a light axis of the beam light as a correcting lens having bow-eliminating function may be considered, however, difficulty in manufacturing may arise for the reason in the following when applied to a multi-beam scanning optical apparatus which collectively reflects a plurality of the beam lights by the polygon mirror. Firstly, the correcting lens is provided one by one for each of the plurality of beam lights. And the degree of the bow is generally different from each of the beam lights. Accordingly, when the bow is eliminated by a lens figure itself of such as the aspherical lens and the surface-decentered lens, it is required to change the figure of each of correcting lenses corresponding to each of a plurality of the beam lights. In short, correcting lenses corresponding to each of the beam lights cannot to be uniformed.

On the other hand, when the bow is eliminated by decentering arrangement (shift and tilt) of the correcting lens as described in the present invention, the correcting lenses with respect to each of the beam lights are uniformed by properly adjusting the shift amount and the tilt amount of each of the correcting lenses.

Here, it is understood that the bow of the beam light can be desirably eliminated when a concrete curvature change of the curvature changing lens is a change of second order or higher order with respect to the distance in the main scanning direction from the center position. In addition, it is important for securing the effect of the present invention that the beam light outputted from the light source should fall on the polygon mirror at an angle up to ±2° with respect to the cross section perpendicular to the sub scanning direction.

Furthermore, the present invention is applicable to a multi-beam scanning optical apparatus comprising a plurality of light sources.

When in a multi-beam scanning optical apparatus, for the purpose of guiding a plurality of beam lights to each of corresponding photoreceptor drums, separation of corresponding beam lights with respect to the sub scanning direction is required, however, such separation of beam lights becomes difficult when incident angles of a plurality of beam lights are maintained up to ±2°. Here, when the curvature changing lens has a negative refractive force in the sub scanning direction, even the angular difference of the beam lights falling on at a shallow angular difference within ±2° can be magnified, thereby enabling separation of each of the beam lights in the sub scanning direction.

According to the present invention, curvature of a scanning path of the beam light, that is, the "bow" can be eliminated with a curvature changing lens in a simple (therefore, easy for die machining) shape merely changing its curvature with respect to a main scanning direction. In short, this enables maintaining a linear scanning path of the beam light. And also, by providing both the curvature changing lens and the decentered lens with a function for eliminating the bow and dispersing the bow-eliminating burden into both of the lenses, spherical aberration of the beam light on the scanning surface can be suppressed small, without eliminating the bow merely with the curvature changing lens.

These and other objects, features and advantages of the present invention will become more apparent upon reading of the following detailed description along with the accompanied drawings.

DETAILED DESCRIPTION OF THE PREFERRED EMBODIMENTS

With embodiments of the present invention described hereinafter with reference to the accompanying drawings, it is to be understood that the invention is not limited to those precise embodiments, and that various changes and modifications may be effected therein by one skilled in the art without departing from the scope or spirit of the invention as defined in the appended claims.

(1) General Structure of a Printer A Comprising a Scanning Optical Apparatus X1 According to One Embodiment of the Present Invention Hereinafter, a printer A comprising a scanning optical apparatus X1 according to one embodiment of the present invention is explained as referring to FIG. 1.

Figure 1:
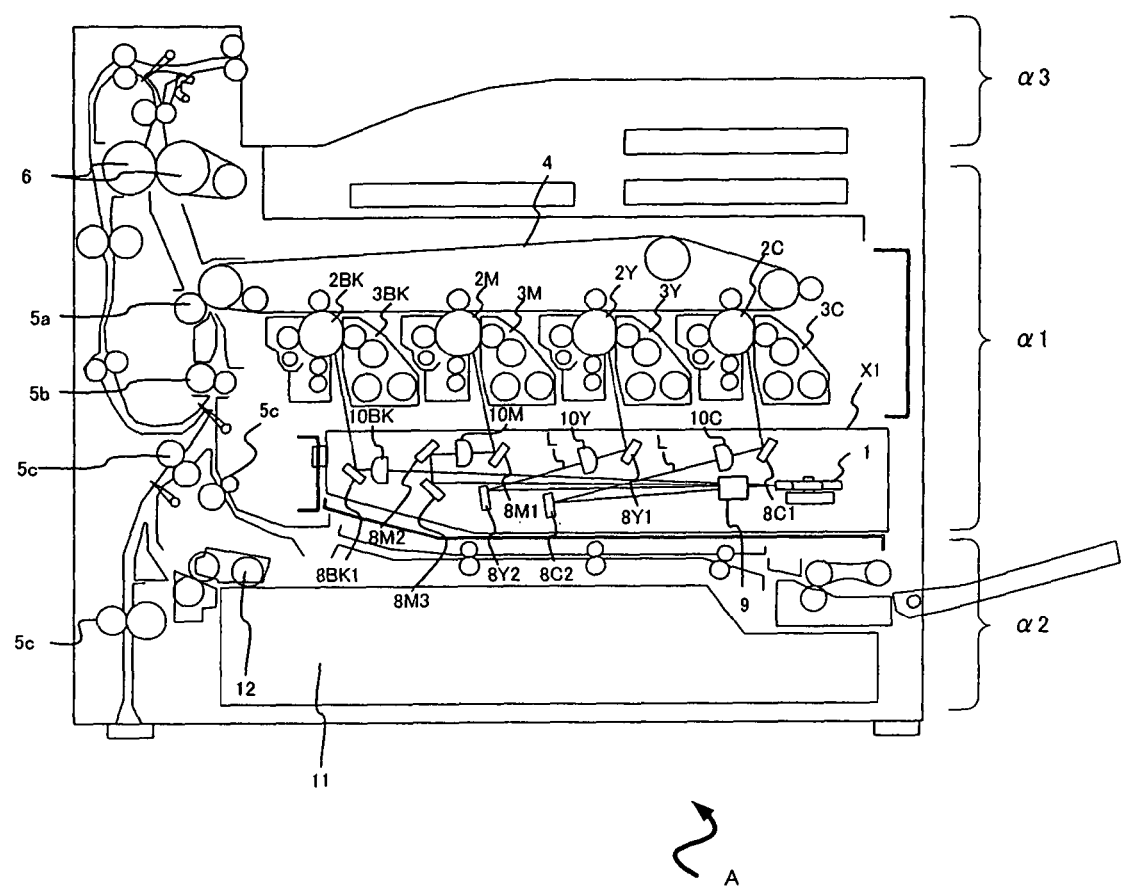
FIG. 1 shows a schematic sectional view of a printer comprising a scanning optical apparatus according to one embodiment of the present invention.

Printer A shown in FIG. 1 has a printing unit α1 for conducting printing on a printing paper and forming a toner image, a paper feeder α2 for feeding the printing paper to Printing unit α1, and a paper discharger α3 for discharging the printing paper on which printing has been conducted. Through an external input-interface not shown, a prescribed printing request signal indicating printing request, as well as an image data signal indicating image data are inputted from an external device connected to Printer A (typically, a personal computer). The image data is read by an image processing controller not shown based on the image data signal, and transformed into a gray value data with respect to each of four colors: black (BK), magenta (M), yellow (Y), and cyan (C).

Printing unit α1 is generally consisted of such as photoreceptor drums 2BK, 2M, 2Y, and 2C corresponding to each of the above-mentioned four colors, Scanning optical apparatus X1 according to one embodiment of the present invention, developing apparatuses 3BK, 3M, 3Y, and 3C corresponding to each of the colors, a intermediate transfer belt 4, various rollers 5, and a fixing apparatus 6.

The image processing controller controls four light sources 7 (see FIG. 2, a black light source 7BK, a magenta light source 7M, a yellow light source 7Y, and a cyan light source 7C) for illuminating light on each of Photoreceptor drums 2 corresponding to four colors: black (BK), magenta (M), yellow (Y), and cyan (C) (a black Photoreceptor drum 2BK, a magenta Photoreceptor drum 2M, a yellow Photoreceptor drum 2Y, and a cyan Photoreceptor drum 2C) according to the gray value data, thereby illuminating a beam light L.

Beam light L is, as described later in details, guided to each of Photoreceptor drums 2 in the above by Scanning optical apparatus X1 having a plurality of deflecting mirrors 8, Polygon mirror 1, various lenses 9 and 10, and this allows an electrostatic latent image to be formed on a surface of each of Photoreceptor drums 2.

And also, the toner on developing rollers equipped in Developing apparatuses 3 (a black developing apparatus 3BK, a magenta developing apparatus 3M, a yellow developing apparatus 3Y, and a cyan developing apparatus 3C) corresponding to each of Photoreceptor drums 2 is pulled onto the surface of Photoreceptor drums 2, and the electrostatic latent image is therefore developed by the toner as a toner image in accordance with electrical potential gap (developing bias) between each of Photoreceptor drums 2 and each of the developing rollers.

Paper feeder α2 is generally consisted of such as a paper cassette 11 and a paper feeding roller 12. Printing paper is set in Paper cassette 11 in advance. Paper feeding roller 12 is rotationally driven by the control of the image processing controller 5 based on a printing request from an user (for example, an operation input by a operation panel equipped in the exterior of Printer A), and then, the printing paper set in Paper cassette 11 is delivered into Printing unit α1.

The printing paper from Paper feeder α2 is delivered by a delivery roller 5c. And the printing paper is then placed in a standby state for a proper moment at a resist roller 5b. This enables adjustment of reaching timing of the printing paper to the nip between Intermediate transfer belt 4 and a secondary transfer roller 5a. At the same time, the toner image formed on each of Photoreceptor drums 2 is transferred onto Intermediate transfer belt 4, and, by a drive thereof, transferred onto the printing paper passing through the nip between Intermediate transfer belt 4 and Secondary transfer 15 roller 5a. And the printing paper with the toner image transferred thereon is then delivered into Fixing apparatus 6, then, the toner image is fixed onto the printing paper with, for example, a heat roller and the like. The printing paper with the toner image fixed thereon is then delivered into Paper discharger α3, and be discharged.

(2) General Structure of Scanning Optical Apparatus X1 According to One Embodiment of this Invention Scanning optical apparatus X1 is for guiding each of Beam lights L for writing electrostatic latent image emitted from Light sources 7BK, 7M, 7Y and 7C to Photoreceptor drums 2BK, 2M, 2Y and 2C.

Figure 2:
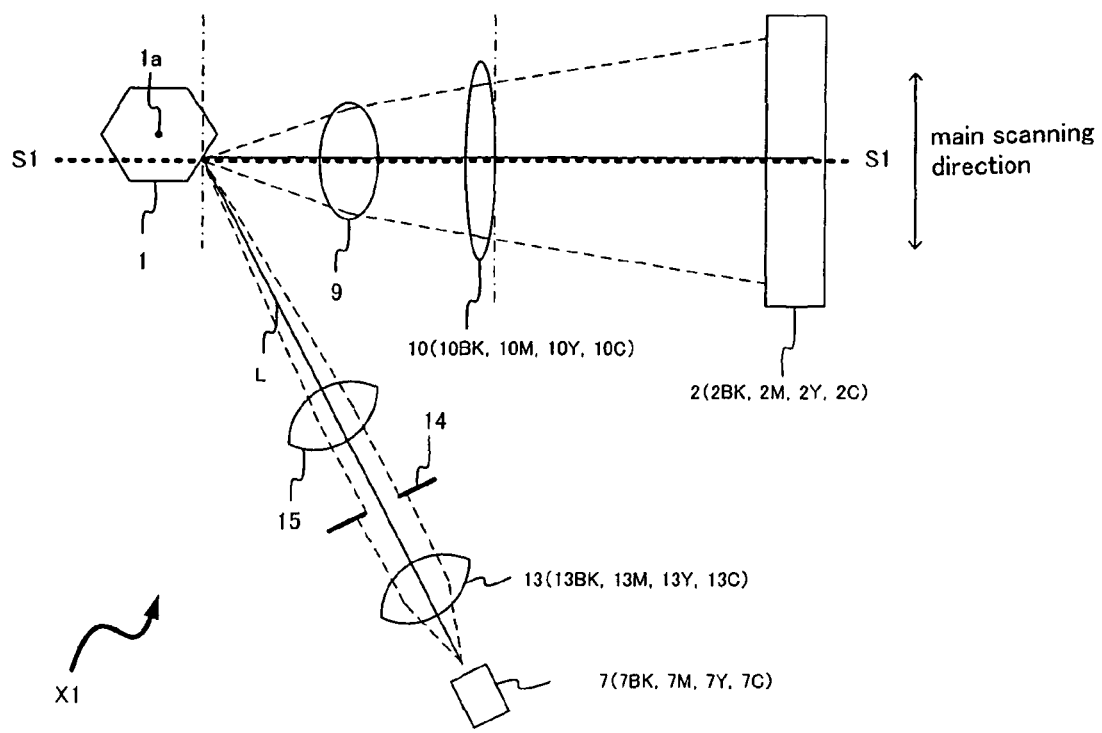
FIG. 2 shows a sectional view in a main scanning direction of a scanning optical apparatus according to one embodiment of the present invention.

FIG. 2 shows a sectional view in a main scanning direction of Scanning optical apparatus X1 according to one embodiment of this invention. Hereinafter, as referring to FIGS. 1 and 2, Scanning optical apparatus X1 is described. As mentioned above, Scanning optical apparatus X1 is applied to a tandem-type Printer A, in which light paths for guiding Beam lights L to each of four Photoreceptor drums 2BK, 2M, 2Y and 2C are formed. However, only one of four light paths is hypothetically illustrated in FIG. 2 for simplicity.

Scanning optical apparatus X1 comprises: Light sources 7 corresponding to each of the above-mentioned four colors (a black light source 7BK, a magenta light source 7M, a yellow light source 7Y, and a cyan light source 7C); collimator lenses 13 corresponding to each of the four colors (a black collimator lens 13BK, a magenta collimator lens 13M, a yellow collimator lens 13Y, and a cyan collimator lens 13C); an aperture 14; a cylindrical lens 15; Polygon mirror 1; a scanning lens 9 common between the four colors; correcting lenses 10 corresponding to each of the four colors (a black correcting lens 10BK, a magenta correcting lens 10M, a yellow correcting lens 10Y, and a cyan correcting lens 10C). Scanning optical apparatus X1 also comprises, such as one or a plurality of Deflecting mirrors 8 corresponding to each of the four colors (a black deflecting mirror 8BK1, magenta deflecting mirrors 8M1, 8M2, and 8M3, yellow deflecting mirrors 8Y1 and 8Y2, and cyan deflecting mirrors 8C1 and 8C2), however not shown in FIG. 2.

Each of Beam lights L outputted from Light sources 7 are transformed into parallel lights (the light with no diameter changes relative to the traveling direction) by passing through Collimator lens 13. Also, each of Beam lights L is shaped by passing through Aperture 14. Furthermore, each of Beam lights L passes through Cylindrical lens 15, and, by means of the light condensing effect thereof, converges near the surface of Polygon mirror 1. Polygon mirror 1 rotates about Rotational axis 1a along the sub scanning direction, and thereby transforming each of Beam lights L into a scanning light for scanning the surface (scanning surface) of each of corresponding Photoreceptor drums 2.

Each of Beam lights L for scanning after being reflected by Polygon mirror 1 falls on Scanning lens 9 common between each of a plurality of Beam lights L.

Each of Beam lights L after passing through Scanning lens 9 is then gradually separated, passes through Correcting lens 10 provided one-on-one for each of Beam lights L, and scans on each of corresponding Photoreceptor drums 2.

Figure 3:
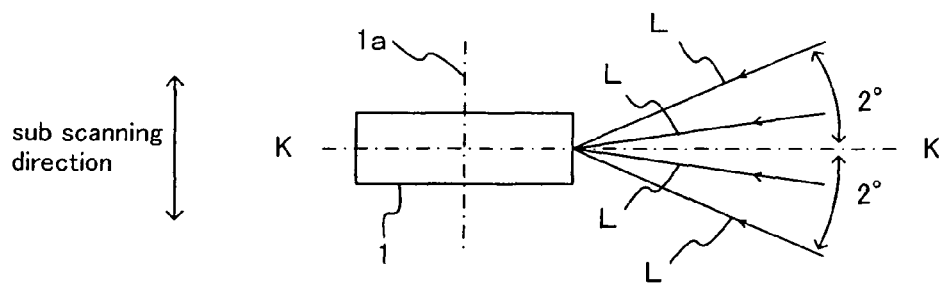
FIG. 3 shows a sectional view in a sub scanning direction near a polygon mirror of a scanning optical apparatus according to one embodiment of the present invention.

(3) Elimination of the Bow by Scanning Lens 9 and Correcting Lens 10 Comprised in Scanning Optical Apparatus X1 According to one Embodiment of this Invention FIG. 3 shows a sectional view of the vicinity of Polygon mirror 1 in the sub scanning direction of Scanning optical apparatus X1.

As mentioned above, Scanning optical apparatus X1 includes a plurality of Light sources 7 corresponding to plurality of colors. Each of Beam lights L from the plurality of Light sources 7 is, as shown in FIG. 3, provided with an angular difference in its incident angle at which Beam light L fall on to a cross section K perpendicular to the direction of Rotational axis 1a (the sub scanning direction). And also, Beam light L, which falls on Cross section K at the sharpest angle, is provided with an angular difference of 2° with respect to Cross section K. That is, all of the four Beam lights L fall onto Cross section K at angles of 2° or less.

Figure 5:
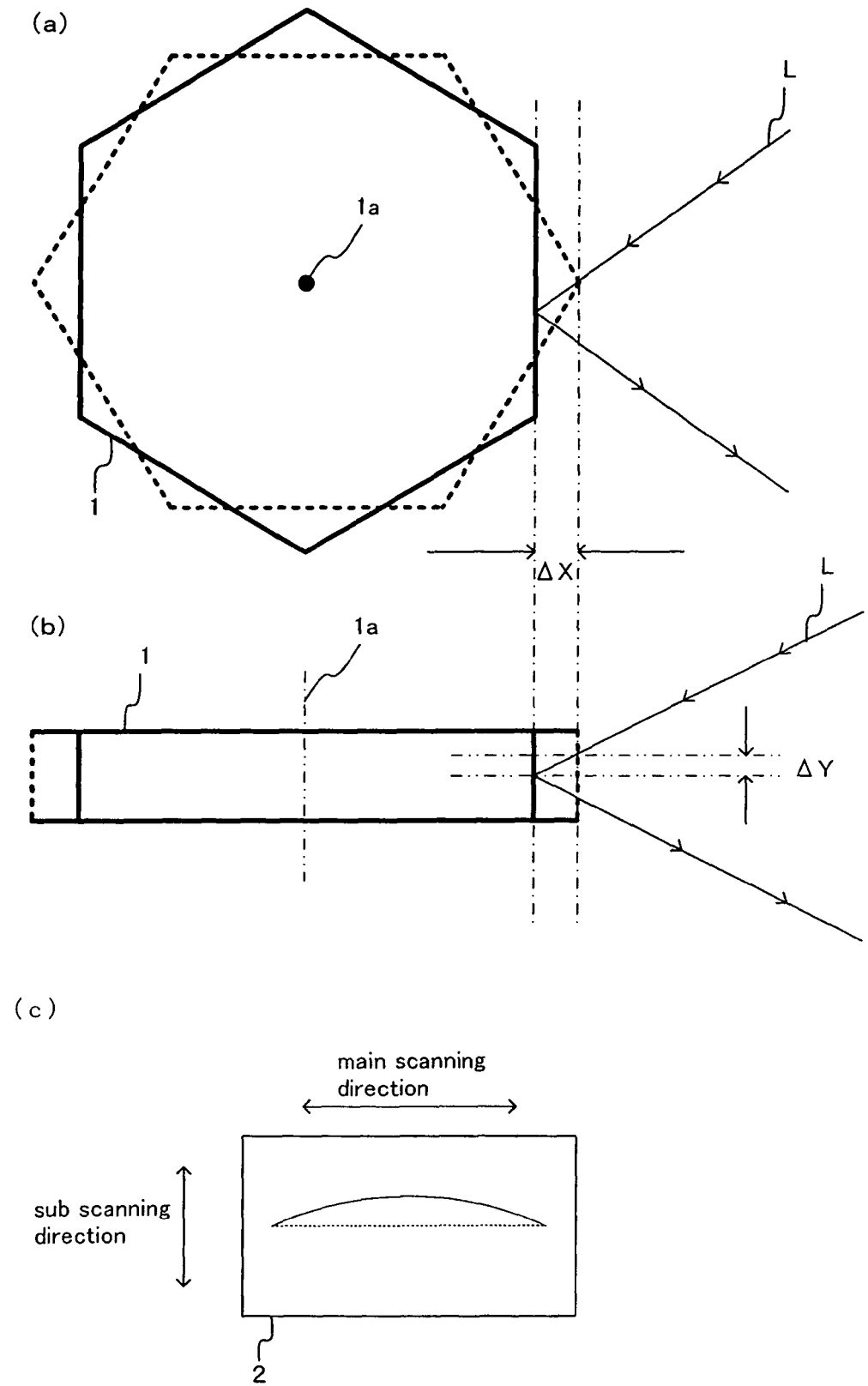
FIG. 5 shows a conceptual diagram for describing a problem (generation of the bow) which occurs when a beam light in an inclined state falls on a polygon mirror.

As shown in FIG. 5, the mirror surface of Polygon mirror 1 moves in and out in the radial direction of Polygon mirror 1 by its rotation about Rotational axis 1a, as mentioned above. With Beam light L falling on the mirror surface having such an in-and-out movement from an oblique direction (not falling on along Cross section K), the position in the sub scanning direction at where Beam lights L are reflected by the mirror surface, changes. Such a position change causes a curvature, that is, the bow of the scanning path of Beam lights L on each of Photoreceptor drums 2.

Here, Scanning lens 9 provided in between Polygon mirror 1 and Photoreceptor drum 2 on the light path of Beam lights L has a shape capable of eliminating most of the bow occurred from the in-and-out movement of the surface of Polygon mirror 1.

Additionally, in the downstream from Scanning lens 9 on the light path of Beam light L, Correcting lens 10 is arranged on the light path of Beam light L with its lens axis a1 inclined with respect to the light axis of Beam light L (hereinafter, referred to as "tilt", that is, one example of decentering), such that the bow which could not be eliminated with Scanning lens 9 can be eliminated.

Scanning lens 9 and Correcting lens 10 are one example of a lens system, and respectively one example of a curvature changing lens and a decentered lens.

Figure 6:
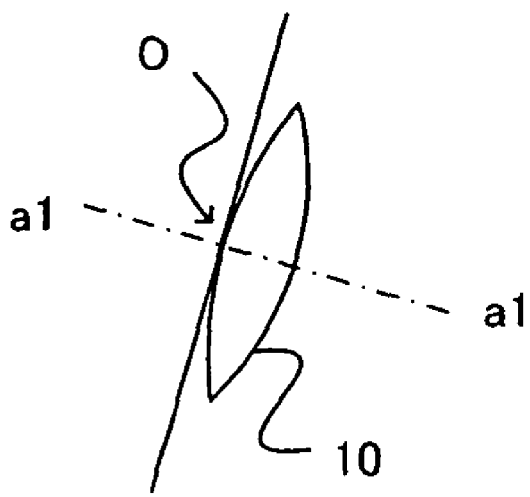
FIG. 6 shows a conceptual diagram for describing definitions of the tilt and the shift.
Figure 6:
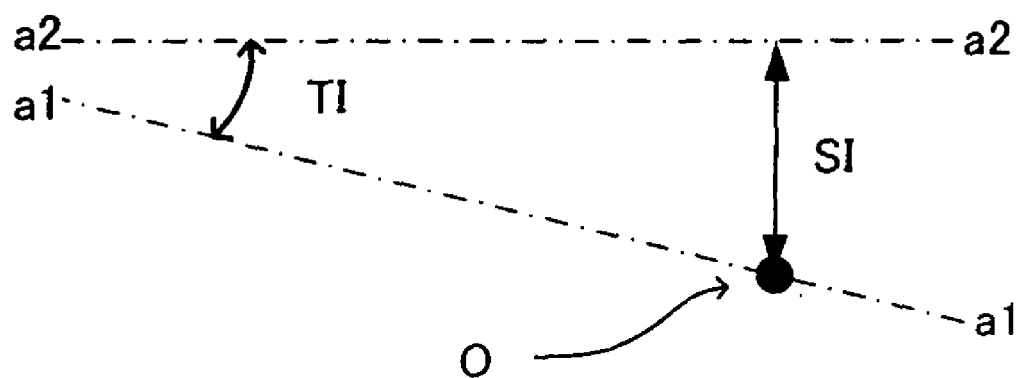

FIG. 6 is a conceptual diagram for describing definitions of the shift and the tilt (decentering). Hereinafter, as referring to FIG. 6, the definition of the tilt as well as the definition of the shift as an another example of decentering are explained, while explaining the definition of a tilt amount TI and a shift amount SI respectively indicating the volume of the tilt and the shift.

As shown in FIG. 6(a), a point intersecting with Lens axis a1 on the surface of Correcting lens 10 is referred to as an original point O of the lens. In this case, as shown in FIG. 6(b), the distance between Original point O and Light axis a2 is Shift amount SI. Also, an angle formed by Lens axis a1 and Light axis a2 is Tilt amount TI. Accordingly, Shift amount SI is expressed in a unit of distance, while Tilt amount TI is expressed in a unit of angle.

Usually, Shift amount SI and Tilt amount TI are independently defined with respect to a single lens. That is, Correcting lens 10 (decentered lens) has two independent parameters (degree of freedom), i.e. Shift amount SI and Tilt amount TI. By using Correcting lens 10 arranged with theses degrees of freedom properly specified therein, the bow, which cannot be eliminated with only Scanning lens 9, can be eliminated. Additionally, only the tilt of the tilt and the shift is employed in the present embodiment.

Figure 4:
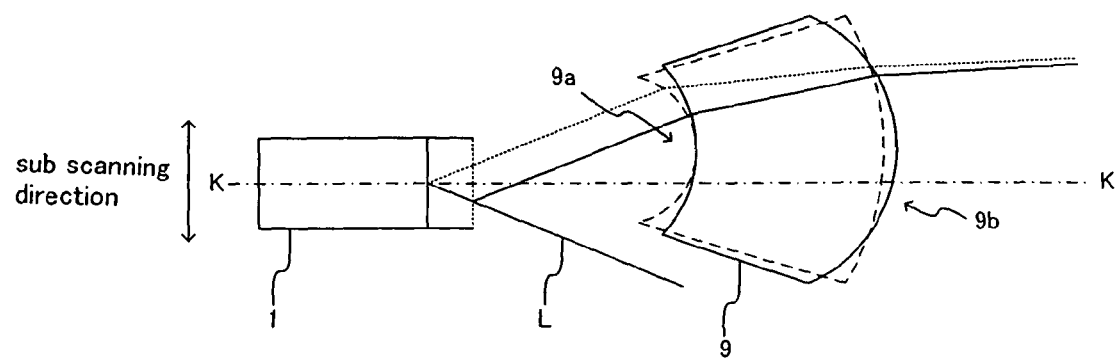
FIG. 4 shows a conceptual diagram for describing elimination of the bow with a scanning optical apparatus according to an embodiment of the present invention.
Figure 4:
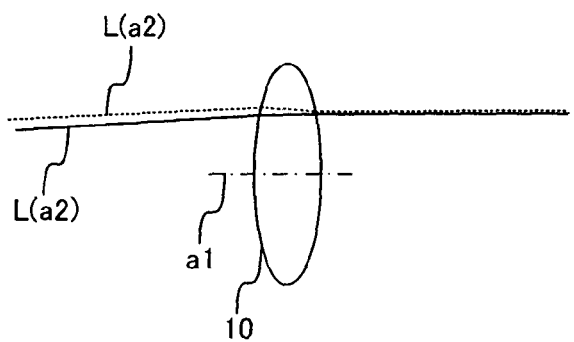

FIG. 4 shows a conceptual diagram for describing elimination of the bow by a scanning optical apparatus according to an embodiment of the present invention. More particularly, FIG. 4(a) shows a cross section in the sub scanning direction of Scanning optical apparatus X1, illustrating the area where Polygon mirror 1 and Scanning 9 are the center, while FIG. 4(b) illustrating the area where Correcting lens is the center. Hereinafter, as referring to FIG. 4, a method for eliminating the bow by Scanning optical apparatus X1 according to one example of the present invention is explained.

Additionally, in the following, a straight line S1-S1 is a line connecting the reflecting point of Beam light L on Polygon mirror 1 and the center part in the main scanning direction of Photoreceptor drum 2, which bisects the scanning range of Beam light L (that is, a straight line indicating the center part of the scanning range of the beam light in the main scanning direction, see FIG. 2). The intersecting point of the straight line S1-S1 with Scanning lens 9 is one example of a predetermined center position in the main scanning direction.

Additionally, in FIG. 4, in the cross sections in the sub scanning direction of Scanning lens 9, the cross section of near the edge of Scanning lens 9 in the main scanning direction is indicated in a dashed line, while the cross section of center part of Scanning lens 9 in the main scanning direction (the cross section along the straight line S1-S1) is indicated in a full line. Similarly, Beam light L passing near the edge of Scanning lens 9 in the main scanning direction is indicated in a dashed line, while Beam light L passing through the center part of Scanning lens 9 in the main scanning direction is indicated in a full line.

Moreover, in FIG. 4, only one light axis of a specific Beam light L among four Beam lights L corresponding to each of the colors is illustrated, however, the following explanation can commonly be approved with respect to four Beam lights L.

Here, the figure of an incident surface 9a and an outputting surface 9b of Beam light L of Scanning lens 9 (one example of a curvature changing lens) is expressed in a free-curved surface expression indicated in the following Expression 1.

$$\begin{cases} f(y) = \dfrac{y^2/r_m}{1+\sqrt{1-(1+K_m)y^2/r_m^2}} + A_3 y^3 + A_4 y^4 + \\ \qquad\qquad A_5 y^5 + A_6 y^6 + A_8 y^8 + A_{10} y^{10} \\ r_s = r_{s0} + B_1 y + B_2 y^2 + B_3 y^3 + B_4 y^4 + B_6 y^6 + \\ \qquad\qquad B_8 y^8 + B_{10} y^{10} \\ x = f(y) + r_s\left(1 - \sqrt{1-(z/r_s)^2}\right) \end{cases} \quad \text{[Equation 1]}$$

In this regard, x is a sag amount in the light axis direction of Beam light L (the horizontal direction in FIG. 3), y is a position in the main scanning direction (the depth direction in FIG. 4) (the original point is a position of the lens axis of Scanning lens 9), z is a position in the sub scanning direction (the original point is an intersecting point of Incident surface 9a or Outputting surface 9b with Straight line S1-S1, that is, a predetermined center position), $r_m$ is a curvature with respect to the main scanning direction, $r_s$ is a curvature with respect to the sub scanning direction (that is, a curvature in the cross section in the sub scanning direction), $K_m$ is a conic coefficient, and A3 to A10 and B1 to B10 are coefficients should be specified accordingly at the time of optical designing of Scanning optical apparatus X1.

As shown in FIG. 4 and Expression 1, Incident surface 9a and Outputting surface 9b of Beam light L of Scanning lens 9 (one example of a curvature changing lens) have a constant curvature $r_s$ in their sectional surfaces in the sub scanning direction, that is, having a spherical cross section in the sub scanning direction.

In addition, the curvature of the cross section in the sub scanning direction of Incident surface 9a and Outputting surface 9b monotonically changes according to the position in the main scanning direction (in this regard, changes monotonically only when B1 and B3 in the above Expression 1 are zero, and Scanning lens 9 is designed so as to satisfy such conditions). More particularly, the curvature of Incident surface 9a of Scanning lens 9 monotonically increases according to the distance in the main scanning direction from Straight line S1-S1. On the other hand, the curvature of Outputting surface 9b of Scanning lens 9 monotonically decreases with respect to the distance in the main scanning direction from Straight line S1-S1. Needless to say, Scanning lens 9 has a symmetrical figure in the main scanning direction with respect to Straight line S1-S1. Additionally, the curvature change of Incident surface 9a and Outputting surface 9b of Scanning lens 9 (a curvature changing lens) is, as is clear from Expression 1, a change of up to $10^{th}$ order at the greatest (second order and/or higher order) with respect to the distance from Straight in the main scanning direction line S1-S1.

As mentioned above, Beam lights L have a different position to be reflected by Polygon mirror 1 in the sub scanning direction according to the incident angle with respect to the reflecting surface of Polygon mirror 1 (according to the position in the main scanning direction when falling on Scanning lens 9 after being reflected by Polygon mirror 1). Consequently, according to the position of Beam light L in the main scanning direction at the time of falling on Scanning lens 9, the position of Beam light L falling on Scanning lens 9 in the sub scanning direction is changed. For example, in the example of FIG. 4, the nearer the edge of Scanning lens 9 in the main scanning direction Beam light L falls on (the beam light in a dashed line in FIG. 4), the upper the part of Scanning lens 9 (one edge of Scanning lens 9 with respect to the sub scanning direction) it falls on. On the other hand, the nearer Straight line S1-S1 Beam light L is (the beam light in a full line in FIG. 4), the nearer the center part of Scanning lens 9 in the sub scanning direction it falls on.

However, when the incident position of Beam light L on Scanning lens 9 in the sub scanning direction changes according to the position in the main scanning direction, the refracting direction of Beam light L changes according also to the position in the main scanning direction since the curvature of Incident surface 9a of Scanning lens 9 monotonically changes according to the position in the main scanning direction. Accordingly, the traveling direction of the beam light passing through within Scanning lens 9 changes according to the position of the beam light in the main scanning direction. Such a difference of the traveling directions within Scanning lens 9 reduces the position gap between Beam lights L in the sub scanning direction with respect to the positions in the main scanning direction when Beam lights L are outputted from Scanning lens 9, compared with when they fall on.

Moreover, the curvature of Outputting surface 9b changes according also to the position in the main scanning direction, and the refracting directions of Beam lights L also differs according to the positions in the main scanning direction. This allows the traveling directions of Beam lights L, which differed according to every position of Beam lights L in the main scanning direction within Scanning lens 9, to be nearly uniformed after being outputted from Outputting surface 9b.

As mentioned above, position gap between Beam lights L in the sub scanning direction is decreased with respect to arbitrary positions in the main scanning direction after passing through Scanning lens 9, and their traveling directions are also nearly uniformed in this situation.

And then, Beam light L falls on Correcting lens 10 in the above situation.

As mentioned above, Correcting lens 10 is arranged with its Lens axis a1 (the axis passing through the center of the lens, intersecting with the lens surface at right angle) tilted with respect to the light axis of Beam light L falling on, as shown in FIG. 4(b). By passing through the above mentioned Correcting lens 10 after Scanning lens 9, with their position gaps in the sub scanning direction reduced with respect to their arbitrary positions in the main scanning direction, and with their traveling directions nearly uniformed, Beam lights L are uniformed in the position in the sub scanning direction with respect to the position in the main scanning direction with higher degree of accuracy when being outputted, and their traveling directions are also uniformed with a high degree of accuracy.

This allows scanning paths of Beam lights L to be maintained linear on the surface of Photoreceptor drums 2 (the bow is eliminated), thereby forming a beautiful electrostatic latent image without distortion.

In addition, a required tilt amount of Correcting lens 10 for elimination of the bow differs from every Beam lights L (that is, from every Correcting lens 10), however, Correcting lenses 10 corresponding to each of Beam lights L can basically be of an identical shape. In other words, by properly specifying the tilt amount as a parameter which is controllable even under the condition where a lens figure is fixed for every Correcting lens 10 (that is, common for every beam lights), the bow different from every Beam lights L can be eliminated.

(4) Relationship Between an Incident Angle of Beam Light L on Cross Section K and a Degree of the Bow The following Chart 1 to Chart 16 indicate various constant numbers prescribing optical designs of a scanning optical apparatus. In this regard, each of the following Charts 1 to 4, Charts 5 to 8, Charts 9 to 12, and Charts 13 to 16 are prescribing optical designs of a scanning optical apparatus as a group. More particularly, optical designs of a scanning optical apparatus are indicated, in Charts 1 to 4: Beam light L falls on Polygon mirror 1 at an angle of ±1° with respect to Cross section K perpendicular to the sub scanning direction (see FIG. 3) (hereinafter, referred to as "the first case"), in Charts 5 to 8: Beam light L falls on Polygon mirror 1 at an angle of ±2° (hereinafter, referred to as "the second case"), in Charts 9 to 12: Beam light L falls on Polygon mirror 1 at an angle of ±3° (hereinafter, referred to as "the third case"), and in Charts 13 to 16: Beam light L falls on Polygon mirror 1 at an angle of ±4° (hereinafter, referred to as "the fourth case").

However, in the first to forth cases, the tilt of Correcting lens 10 (one example of decentering arrangement) is not employed as in Scanning optical apparatus X1 according to one embodiment of the present invention. The concrete example of optical design and the effect of the bow elimination when Correcting lens 10 is tilted (that is, according to the present invention) are described later, and the first to forth cases are consistently exemplifying for describing changes of the bow with respect to the incident angles of Beam light L to Cross section K.

Surface numbers 1, 2, 3, and 4 indicated in Charts 2, 4, 6, 8,10,12,14,and 16 in below are corresponding respectively to Incident surface 9a and Outputting surface 9b of Beam light L of Scanning lens 9, an incident surface (though not shown in the figure, is referred to "incident surface 10a") and an outputting surface (similarly, is referred to "outputting surface 10b") of Beam light L of Correcting lens 10. And also, Surface separation numbers 1, 2, 3, and 4 are corresponding respectively to the separations between: Incident surface 9a and Outputting surface 9b, Outputting surface 9b and Incident surface 10a, Incident surface 10a and Outputting surface 10b, and Outputting surface 10b and a scanning surface on Photoreceptor drum 2.

Similarly, Surface numbers 1 and 2 in Charts 3, 7, 11, and 15 are corresponding respectively to the incident surface (though not shown in the figure, is referred to as "incident surface 15a") and the outputting surface (similarly, is referred to as "outputting surface 15b") of Beam light L on Cylindrical lens 15. And also, Surface separation numbers 1 and 2 are corresponding respectively to the separations between Incident surface 15a and Outputting surface 15b, and Outputting surface 15b and the reflecting surface of Beam light L of Polygon mirror 1.

In addition, as is clear from Charts 2, 6, 10, and 14, a free-curved surface expressed through Expression 1 is employed not only on Incident surface 9a and Outputting surface 9b of Scanning lens 9, but also on Incident surface 10a of Correcting lens 10.

Figure 7:
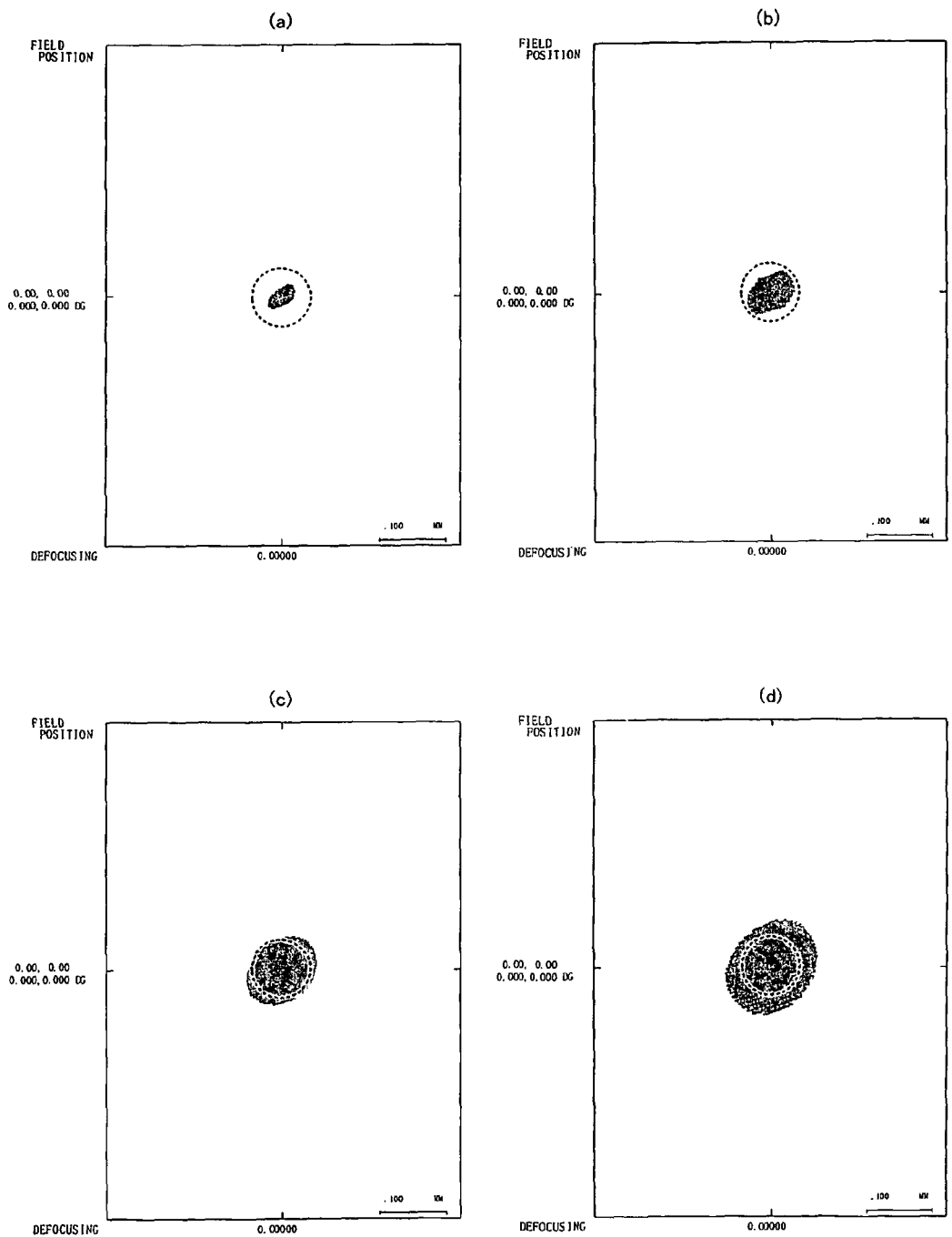
FIG. 7 shows a plane view indicating a reaching point of a beam light to a photoreceptor drum.

Here, FIG. 7 shows a plane view indicating a reaching point of Beam light L to Photoreceptor drum 2. More particularly, FIGS. 7(a), 7(b), 7(c), and 7(d) respectively show a plane view of the first case, the second case, the third case, and the fourth case.

Here, the size of the reaching range of Beam lights L shown in FIG. 7 nearly becomes synonymous with the size of the bow appeared on Photoreceptor drums 2. Accordingly, it indicates that, the more the reaching range of Beam lights L is narrowed down, the more linear the scanning paths of Beam lights L are, and the smaller the bow becomes. In addition, the circles in dashed line shown in FIGS. 7(a) to 7(d) indicate the boundary of reaching range of Beam lights L for obtaining a desirable image quality by means of suppressing the bow. That is, the situation where Beam lights L are converged within the dashed line circle indicates that the bow is controlled enough to obtain a nearly desirable image quality.

CHART 1

| | |
|---|---|
| Incident angle to the polygon mirror | main direction: 60[deg] sub direction: 1[deg] |
| Polygon figure | inscribed 40 [mm] octahedron |
| Aperture figure | 5.2 × 1.2[mm] ellipse |
| Wavelength/temperature | 655[nm] 20[° C.] |
| Polygon mirror-Scanning lens | 50[mm] |
| Focusing distance | 300[mm] |
| Maximum image height | 157[mm] |

CHART 2

| Surface number | curvature radius (main scanning direction) | curvature radius (sub scanning direction) | surface figure | refraction index | surface separation number | surface separation |
|---|---|---|---|---|---|---|
| 1 | −123.243 | −27.000 | free-curved surface | 1.507595 | 1 | 12.00 |
| 2 | −69.394 | −48.661 | free-curved surface | | 2 | 210.00 |
| 3 | −1534.950 | 50.884 | free-curved surface | 1.507595 | 3 | 5.00 |
| 4 | ∞ | −105.241 | cylinder surface | | 4 | 90.00 |

CHART 3

| Surface number | curvature radius (main scanning direction) | curvature radius (sub scanning direction) | refraction index | surface separation number | surface separation |
|---|---|---|---|---|---|
| 1 | ∞ | 124.353 | 1.513895 | 1 | 3.00 |
| 2 | ∞ | ∞ | | 2 | 240.00 |

CHART 4

| Surface number | A3 | A4 | A5 | A6 | A8 | A10 | Km |
|---|---|---|---|---|---|---|---|
| 1 | 0 | 4.19E−07 | 0 | 5.15E−11 | −4.30E−16 | −5.68E−17 | 8.9937 |
| 2 | 0 | 5.75E−07 | 0 | 1.33E−10 | 4.02E−14 | −1.00E−17 | 1.6959 |
| 3 | 0 | 2.85E−08 | 0 | −4.55E−13 | 3.61E−18 | 3.50E−24 | −132.3089 |

| Surface number | B1 | B2 | B3 | B4 | B6 | B8 | B10 |
|---|---|---|---|---|---|---|---|
| 1 | 0 | −8.49E−02 | 0 | 0 | 0 | 0 | 0 |
| 2 | 0 | −1.34E−01 | 0 | 0 | 0 | 0 | 0 |
| 3 | 0 | 7.73E−04 | 0 | 0 | 0 | 0 | 0 |

When designing a Scanning optical apparatus X1 in accordance with Charts 1 to 4 (the first case), in other words, when Beam light L falls on Polygon mirror 1 at an angle of ±1° with respect to Cross section K, Beam light L is sufficiently narrowed down on Photoreceptor drum 2 as shown in FIG. 7(a), and it can be understood that the bow is sufficiently reduced.

CHART 5

| Incident angle to the polygon mirror | main direction: 60[deg]<br>sub direction: 2[deg] |
|---|---|
| Polygon figure | inscribed 40 [mm] octahedron |

CHART 5-continued

| Aperture figure | 5.2 × 1.2[mm] ellipse |
|---|---|
| Wavelength/temperature | 655[nm] 20[° C.] |
| Polygon mirror-Scanning lens | 50[mm] |
| Focusing distance | 300[mm] |
| Maximum image height | 157[mm] |

CHART 6

| Surface number | curvature radius (main scanning direction) | curvature radius (sub scanning direction) | surface figure | refraction index | surface separation number | surface separation |
|---|---|---|---|---|---|---|
| 1 | −123.243 | −27.000 | free-curved surface | 1.507595 | 1 | 12.00 |
| 2 | −69.394 | −48.661 | free-curved surface |  | 2 | 210.00 |
| 3 | −1534.950 | 50.884 | free-curved surface | 1.507595 | 3 | 5.00 |
| 4 | ∞ | −105.241 | cylinder surface |  | 4 | 90.00 |

CHART 7

| Surface number | curvature radius (main scanning direction) | curvature radius (sub scanning direction) | refraction index | surface separation number | surface separation |
|---|---|---|---|---|---|
| 1 | ∞ | 124.353 | 1.513895 | 1 | 3.00 |
| 2 | ∞ | ∞ |  | 2 | 240.00 |

CHART 8

| Surface number | A3 | A4 | A5 | A6 | A8 | A10 | Km |
|---|---|---|---|---|---|---|---|
| 1 | 0 | 4.19E−07 | 0 | 5.15E−11 | −4.30E−16 | −5.68E−17 | 8.9937 |
| 2 | 0 | 5.75E−07 | 0 | 1.33E−10 | 4.02E−14 | −1.00E−17 | 1.6959 |
| 3 | 0 | 2.85E−08 | 0 | −4.55E−13 | 3.61E−18 | 3.50E−24 | −132.3089 |

| Surface number | B1 | B2 | B3 | B4 | B6 | B8 | B10 |
|---|---|---|---|---|---|---|---|
| 1 | 0 | −8.41E−02 | 0 | 0 | 0 | 0 | 0 |
| 2 | 0 | −1.32E−01 | 0 | 0 | 0 | 0 | 0 |
| 3 | 0 | 7.73E−04 | 0 | 0 | 0 | 0 | 0 |

When designing a scanning optical apparatus in accordance with Charts 5 to 8 (the second case), in other words, when Beam light L falls on Polygon mirror 1 at an angle of ±2° with respect to Cross section K, the reaching range of Beam light L is on the verge of being dissipated from the above-mentioned area of the dashed line circle, i.e. in a crucial situation, and shows a limiting point for meeting the conditions necessary for image quality.

CHART 9

| | |
|---|---|
| Incident angle to the polygon mirror | main direction: 60[deg] sub direction: 3[deg] |
| Polygon figure | inscribed 40 [mm] octahedron |
| Aperture figure | 5.2 × 1.2[mm] ellipse |
| Wavelength/temperature | 655[nm] 20[° C.] |
| Polygon mirror-Scanning lens | 50[mm] |
| Focusing distance | 300[mm] |
| Maximum image height | 157[mm] |

CHART 10

| Surface number | curvature radius (main scanning direction) | curvature radius (sub scanning direction) | surface figure | refraction index | surface separation number | surface separation |
|---|---|---|---|---|---|---|
| 1 | −123.243 | −27.000 | free-curved surface | 1.507595 | 1 | 12.00 |
| 2 | −69.394 | −48.661 | free-curved surface | | 2 | 210.00 |
| 3 | −1534.950 | 50.884 | free-curved surface | 1.507595 | 3 | 5.00 |
| 4 | ∞ | −105.241 | cylinder surface | | 4 | 90.00 |

CHART 11

| Surface number | curvature radius (main scanning direction) | curvature radius (sub scanning direction) | refraction index | surface separation number | surface separation |
|---|---|---|---|---|---|
| 1 | ∞ | 124.353 | 1.513895 | 1 | 3.00 |
| 2 | ∞ | ∞ | | 2 | 240.00 |

CHART 12

| Surface number | A3 | A4 | A5 | A6 | A8 | A10 | Km |
|---|---|---|---|---|---|---|---|
| 1 | 0 | 4.19E−07 | 0 | 5.15E−11 | −4.30E−16 | −5.68E−17 | 8.9937 |
| 2 | 0 | 5.75E−07 | 0 | 1.33E−10 | 4.02E−14 | −1.00E−17 | 1.6959 |
| 3 | 0 | 2.85E−08 | 0 | −4.55E−13 | 3.61E−18 | 3.50E−24 | −132.3089 |

| Surface number | B1 | B2 | B3 | B4 | B6 | B8 | B10 |
|---|---|---|---|---|---|---|---|
| 1 | 0 | −8.28E−02 | 0 | 0 | 0 | 0 | 0 |
| 2 | 0 | −1.30E−01 | 0 | 0 | 0 | 0 | 0 |
| 3 | 0 | 7.73E−04 | 0 | 0 | 0 | 0 | 0 |

CHART 13

| | |
|---|---|
| Incident angle to the polygon mirror | main direction: 60[deg] sub direction: 4[deg] |
| Polygon figure | inscribed 40 [mm] octahedron |
| Aperture figure | 5.2 × 1.2[mm] ellipse |
| Wavelength/temperature | 655[nm] 20[° C.] |
| Polygon mirror-Scanning lens | 50[mm] |
| Focusing distance | 300[mm] |
| Maximum image height | 157[mm] |

CHART 14

| Surface number | curvature radius (main scanning direction) | curvature radius (sub scanning direction) | surface figure | refraction index | surface separation number | surface separation |
|---|---|---|---|---|---|---|
| 1 | −123.243 | −27.000 | free-curved surface | 1.507595 | 1 | 12.00 |
| 2 | −69.394 | −48.661 | free-curved surface |  | 2 | 210.00 |
| 3 | −1534.950 | 50.884 | free-curved surface | 1.507595 | 3 | 5.00 |
| 4 | ∞ | −105.241 | cylinder surface |  | 4 | 90.00 |

CHART 15

| Surface number | curvature radius (main scanning direction) | curvature radius (sub scanning direction) | refraction index | surface separation number | surface separation |
|---|---|---|---|---|---|
| 1 | ∞ | 124.353 | 1.513895 | 1 | 3.00 |
| 2 | ∞ | ∞ |  | 2 | 240.00 |

CHART 16

| Surface number | A3 | A4 | A5 | A6 | A8 | A10 | Km |
|---|---|---|---|---|---|---|---|
| 1 | 0 | 4.19E−07 | 0 | 5.15E−11 | −4.30E−16 | −5.68E−17 | 8.9937 |
| 2 | 0 | 5.75E−07 | 0 | 1.33E−10 | 4.02E−14 | −1.00E−17 | 1.6959 |
| 3 | 0 | 2.85E−08 | 0 | −4.55E−13 | 3.61E−18 | 3.50E−24 | −132.3089 |

| Surface number | B1 | B2 | B3 | B4 | B6 | B8 | B10 |
|---|---|---|---|---|---|---|---|
| 1 | 0 | −8.11E−02 | 0 | 0 | 0 | 0 | 0 |
| 2 | 0 | −1.27E−01 | 0 | 0 | 0 | 0 | 0 |
| 3 | 0 | 7.73E−04 | 0 | 0 | 0 | 0 | 0 |

When designing a scanning optical apparatus in accordance with Charts 9 to 12 (the third case: when Beam light L falls on Polygon mirror 1 at an angle of ±3° with respect to Cross section K), as well as when designing Scanning optical apparatus X1 in accordance with Charts 13 to 16 (the fourth case: when Beam light L falls on Polygon mirror 1 at an angle of ±4° with respect to Cross section K), as shown in FIGS. 7(c) and (d), the reaching range of Beam light L is dissipated from the above-mentioned area of the dashed line circle, and the bow is large. It can be understood that the conditions necessary for image quality are not satisfied.

From the above, it can be understood that, when Beam light L falls on Cross section K at an angle within ±2°, the bow of Beam light L can be eliminated, by means of monotonically changing the curvature of Incident surface 9a, on which Beam light L falls, and of Outputting surface 9b of Scanning lens 9 according to the position in the main scanning direction. When Beam light L falls on Polygon mirror at an angle greater than this, the bow may become too prominent, thereby failing to eliminate the bow.

(5) Concrete Example of the Optical Design of Scanning Optical Apparatus X1 According to one Embodiment of the Present Invention In Charts 17 to 20, various constant numbers are indicated for prescribing the optical design of Scanning optical apparatus X1. Charts 17 to 20 are also prescribing the optical design of Scanning optical apparatus X1 as a group, and particularly indicate the optical design of when Beam light L falls on Polygon mirror 1 at an angle of ±2° with respect to Cross section K. Additionally, as is clear from Chart 17, Correcting lens 10 is arranged in an inclined (so-called tilted) state around a longitudinal axis across the main scanning direction.

In this regard, Surface numbers 1 to 4 in Charts 18 and 20 are corresponding respectively to Incident surface 9a, Outputting surface 9b, Incident surface 10a, and Outputting surface 10b. And also, Surface separation numbers 1 to 4 are corresponding respectively to the separations between: Incident surface 9a and Outputting surface 9b, Outputting surface 9b and Incident surface 10a, Incident surface 10a and Outputting surface 10b, and Outputting surface 10b and a scanning surface on Photoreceptor drum 2.

Similarly, Surface numbers 1 and 2 in Chart 19 are corresponding respectively to Incident surface 15a and Outputting surface 15b. And also, Surface separation numbers 1 and 2 are corresponding respectively to the separations between: Incident surface 15a and Outputting surface 15b, and Outputting surface 15b and a reflecting surface of Beam light L of Polygon mirror 1.

CHART 17

| | |
|---|---|
| Incident angle to the polygon mirror | main direction: 60[deg] sub direction: 2[deg] |
| Tilt amount of correcting lens | axis rotation in longitudinal direction: 2.965[deg] |
| Polygon figure | inscribed 40 [mm] octahedron |
| Aperture figure | 5.2 × 1.2[mm] ellipse |
| Wavelength/temperature | 655[nm] 20[° C.] |
| Polygon mirror-Scanning lens | 50[mm] |
| Focusing distance | 300[mm] |
| Maximum image height | 157[mm] |

CHART 18

| Surface number | curvature radius (main scanning direction) | curvature radius (sub scanning direction) | surface figure | refraction index | surface separation number | surface separation |
|---|---|---|---|---|---|---|
| 1 | −123.243 | −27.000 | free-curved surface | 1.507595 | 1 | 12.00 |
| 2 | −69.394 | −48.661 | free-curved surface |  | 2 | 210.00 |
| 3 | −1534.950 | 50.884 | free-curved surface | 1.507595 | 3 | 5.00 |
| 4 | ∞ | −105.241 | cylinder surface |  | 4 | 90.00 |

CHART 19

| Surface number | curvature radius (main scanning direction) | curvature radius (sub scanning direction) | refraction index | surface separation number | surface separation |
|---|---|---|---|---|---|
| 1 | ∞ | 124.353 | 1.513895 | 1 | 3.00 |
| 2 | ∞ | ∞ |  | 2 | 240.00 |

CHART 20

| Surface number | A3 | A4 | A5 | A6 | A8 | A10 | Km |
|---|---|---|---|---|---|---|---|
| 1 | 0 | 4.19E−07 | 0 | 5.15E−11 | −4.30E−16 | −5.68E−17 | 8.9937 |
| 2 | 0 | 5.75E−07 | 0 | 1.33E−10 | 4.02E−14 | −1.00E−17 | 1.6959 |
| 3 | 0 | 2.85E−08 | 0 | −4.55E−13 | 3.61E−18 | 3.50E−24 | −132.3089 |

| Surface number | B1 | B2 | B3 | B4 | B6 | B8 | B10 |
|---|---|---|---|---|---|---|---|
| 1 | 0 | 6.38E−02 | 0 | 0 | 0 | 0 | 0 |
| 2 | 0 | 8.66E−02 | 0 | 0 | 0 | 0 | 0 |
| 3 | 0 | 7.73E−04 | 0 | 0 | 0 | 0 | 0 |

Figure 8:
FIG. 8 shows a plane view indicating a reaching point of a beam light to a photoreceptor drum, as a schematic diagram for describing the bow-eliminating effect according to the tilt of a correcting lens.

Here, FIG. 8 shows a plane view indicating reaching points of Beam lights L to Photoreceptor drum 2 when Scanning optical apparatus X1 with its optical design prescribed according to Charts 17 to 20 is used (when the tilt is used).

From the comparison between FIG. 7(b) and FIG. 8, it can be understood that even when the incident angles of Beam lights L with respect to Polygon mirror 1 is the same (both at ±2°), the reaching range of Beam lights L on Photoreceptor drum 2 is slightly narrowed down by arranging Correcting lens 10 in a tilted state (one example of decentering). That means, the tilt of Correcting lens produces the bow eliminating effect.

As indicated in the above concrete example of optical design (that is, in the present invention), elimination of the bow can be realized also by combination of the figure of Scanning lens 9 and the decentering of Correcting lens 1. Such a combination is understood as capable of suppressing spherical aberration on Photoreceptor drum 2 more than when the bow is eliminated only by the figure of Scanning lens 9.

(6) Refractive Force of Scanning Lens 9

In regard to Incident surface 9a and Outputting surface 9b of Scanning lens 9, the curvature is specified such that their cross section figures in the sub scanning direction become concave relative to Polygon mirror 1. This allows Scanning lens 9 to have negative refractive force in the sub scanning direction.

As mentioned above, each of a plurality of Beam lights L falls on Polygon mirror 1, however, separation of Beam lights L in order to guide them to each of corresponding Photoreceptor drums 2 is difficult since the incident angle difference between each of Beam lights L is small (4° at largest). However, by using Scanning lens 9 having a negative refractive force in the sub scanning direction, the directions of beams spread after passing through Scanning lens 9 as described in the present embodiment, and thereby facilitating separation of each of Beam lights L.

In accordance with Scanning optical apparatus X1 according to one embodiment of the present invention, the curve of scanning path of Beam light L can be eliminated by using Scanning lens 9 in a simple (accordingly, easy for die machining) figure that changes its curvature with respect to the main scanning direction, provided that the incident angle of Beam light L with respect to Polygon mirror 1 is 2° or less. That is, the scanning path of Beam light L can be maintained linear. And also, by providing both Scanning lens 9 and Correcting lens 10 with the bow eliminating function, and by dispersing the bow eliminating burden thereto, spherical aberration of Beam light L on the scanning surface of Photoreceptor drum 2 can be suppressed small, without eliminating the bow only by Scanning lens 9.

In the above mentioned embodiment, the example wherein Scanning optical apparatus X1 is applied to a printer is described, however, a scanning optical apparatus according to the present invention is applicable to various image forming apparatuses such as copiers, facsimiles, and MFPs (Multi Function Products).

Additionally, in the above embodiment, the example wherein only the tilt is used as the decentering of Correcting lens 10 is explained, however, it is not intended to limit the scope, and using the shift as well as using both of the tilt and shift can be considered.

Moreover, in the above embodiment, the example wherein the curvature of both Incident surface 9a and Outputting surface 9b of Scanning lens 9 monotonically changes is explained, however, it is not intended to limit the scope, and the bow eliminating function may be realized even when the curvature of only one of Incident surface 9a and Outputting surface 9b monotonically changes.

What is claimed is:

1. A scanning optical apparatus, comprising:
a light source for outputting a beam light;
a polygon mirror for reflecting said beam light outputted from said light source and then transforming said beam light into a scanning light on a prescribed scanning surface as rotating about a rotational axis along a sub scanning direction; and
a lens system provided on a light path of said beam light in between said polygon mirror and said scanning surface, said lens system comprising a curvature changing lens as a lens to the side of said polygon mirror which monotonically changes its curvature of a cross section in said sub scanning direction of an incident surface and/or an outputting surface of said beam light with respect to a distance from a predetermined center position in a main scanning direction, as a scanning direction of said beam light, intersecting with said sub scanning direction, and a decentered lens as a lens to the side of said scanning surface arranged with its lens axis inclined and/or displaced with respect to a light axis of said beam light,
said beam light outputted from said light source falling on said polygon mirror at an angle up to ±2° with respect to a cross section perpendicular to said sub scanning direction.

2. A scanning optical apparatus according to claim 1, wherein a change of curvature in said curvature changing lens is of second order or higher order with respect to a distance in said main scanning direction from said center position.

3. A scanning optical apparatus according to claim 1, further comprising a plurality of said light sources.

4. A scanning optical apparatus according to claim 1, wherein said curvature changing lens has a negative refractive force with respect to said sub scanning direction.

5. A scanning optical apparatus according to claim 3, wherein said curvature changing lens has a negative refractive force with respect to said sub scanning direction.

6. A scanning optical apparatus, comprising:
a light source for outputting a beam light;
a polygon mirror for reflecting said beam light outputted from said light source and then transforming said beam light into a scanning light on a prescribed scanning surface as rotating about a rotational axis along a sub scanning direction; and
a lens system provided on a light path of said beam light in between said polygon mirror and said scanning surface, said lens system comprising a curvature changing lens as a lens to the side of said polygon mirror which monotonically changes its curvature of a cross section in said sub scanning direction of an incident surface and/or an outputting surface of said beam light with respect to a distance from a predetermined center position in a main scanning direction, as a scanning direction of said beam light, intersecting with said sub scanning direction, and a decentered lens as a lens to the side of said scanning surface arranged with its lens axis inclined and/or displaced with respect to a light axis of said beam light,
said beam light outputted from said light source falling on said polygon mirror at an angle not exceeding ±2° with respect to a cross section of said polygon mirror which is perpendicular to said sub scanning direction.

* * * * *